US006346312B1

(12) United States Patent
Billoni

(10) Patent No.: US 6,346,312 B1

(45) Date of Patent: *Feb. 12, 2002

(54) TRANSFER AND METHOD FOR ITS PREPARATION AND USE

(76) Inventor: Giuseppe Billoni, Via Rismondo, 27, Castelletto Borgo, Mantova (IT), I-46100

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/171,931

(22) PCT Filed: Apr. 21, 1997

(86) PCT No.: PCT/IT97/00090

§ 371 Date: Mar. 10, 1999

§ 102(e) Date: Mar. 10, 1999

(87) PCT Pub. No.: WO97/39902

PCT Pub. Date: Oct. 30, 1997

(30) Foreign Application Priority Data

Apr. 24, 1996 (IT) .......................................... BS96A0033

(51) Int. Cl.[7] .................................................. B32B 3/00

(52) U.S. Cl. ........................................ 428/195; 427/149

(58) Field of Search .......................... 428/195; 427/256, 427/331, 149

(56) References Cited

U.S. PATENT DOCUMENTS 5,104,719 A 4/1992 Kamen et al.

FOREIGN PATENT DOCUMENTS

| | | |
|---|---|---|
| EP | 0569921 | 11/1998 |
| WO | 9409983 | 5/1994 |

*Primary Examiner*—Bruce H. Hess
*Assistant Examiner*—Michael Grendzynski
(74) *Attorney, Agent, or Firm*—Darby & Darby

(57) ABSTRACT

The invention falls within the sector of techniques for transferring onto a wall or other support medium ornamental, decorative or advertising motifs. According to the invention, a coating consisting of a solution of a thermoplastic resin (12) is spread on one side of a base film (11) made of plastic material and decorative ornamental subjects (14) are printed in thermoplastic resin coating (12) and a protective covering (15) is applied onto the printed part. If required, a layer of acrylic or vinyl color (13) may be spread on the thermoplastic resin coating (12). The article comprises all the elements described and combined as described in the preparation method.

8 Claims, 1 Drawing Sheet

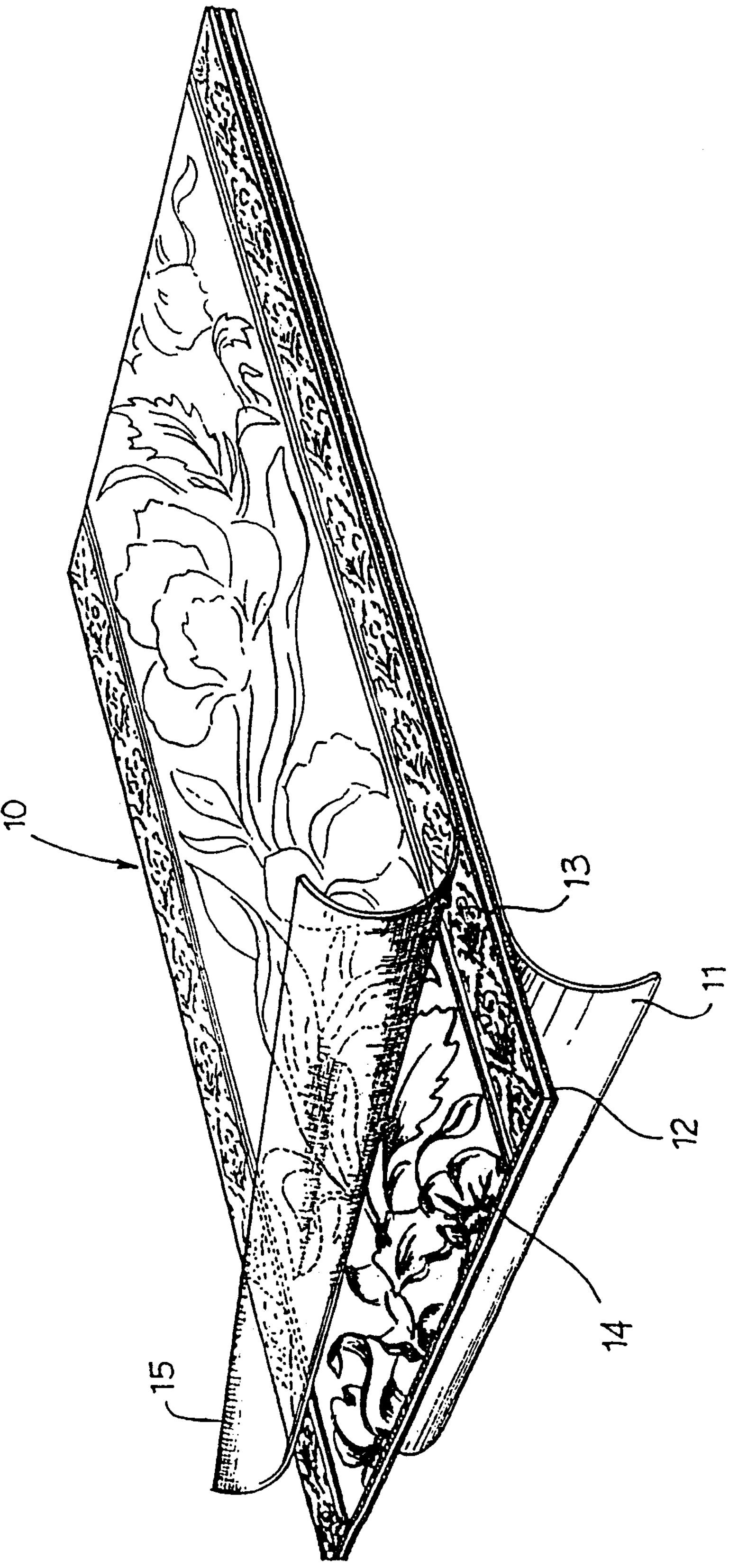
10
13
11
12
14
15

TRANSFER AND METHOD FOR ITS PREPARATION AND USE

FIELD OF THE INVENTION

The present invention relates to the field of transferable articles, i.e., to the technique of transferring onto a wall or other support medium ornamental, decorative, advertising and other such subjects or motifs.

More particularly, the invention relates to a method for preparing and arranging in position, by means of transfer, such transferable articles.

BACKGROUND OF THE INVENTION

Already known are transferable articles and techniques for effecting transfer onto a wall or other surface, which, however, use paper or plastic sheets as a support medium for decorative, advertising and other such subjects.

WO-A-94/09983 discloses a flexible decorative sheet for use in surfacing an automobile body panel comprising a first removable carrier sheet, a clear coat, a tie coat, a color coat, an adhesive layer covered by a second removable sheet and designed to be applied to the panel.

EP A-0569921 discloses a self-adhesive decorative surface covering material comprising a removable casting substrate, an elastomeric film which may be back printed with a decorative design, and an adhesive layer for the applying of the article on a surface.

In the above documents the decoration is applied to the support (panel or wall) through an adhesive and is covered by a protective film, which is not removable and gives to the cover a "Scotch-tape effect" because the decoration is on the back of a film and it is seen through the transparent protective film so the colors result altered.

OBJECT OF THE INVENTION

The object of the present invention is to provide a new method for preparing transferable articles and transferring them onto any surface which may be used on an industrial level, using materials which can be easily found and are relatively low-cost, with a high degree of reliability in terms of results and with an above average performance.

BRIEF DESCRIPTION OF THE DRAWINGS

Said object will be described more fully in the continuation of the description provided with reference to the accompanying drawing in which the sole FIG. 1 shows a perspective view of a portion of an article with separable parts which are partially detached.

DETAILED DESCRIPTION OF THE INVENTION

With the method proposed herein, referring to FIG. 1, using certain raw materials and by means of an industrial manufacturing process, it is possible to obtain decorative, advertising and other such articles 10 which are made transferable owing to a specific combination of components on a base and support film 11.

These components comprise, starting from said base film 11, a coating 12 of thermoplastic resin solution, if necessary, a layer of acrylic or vinyl color 13, a printed motif 14 with typographical colors, and a superficial protective covering 15.

The base film 11 may be a thin continuous sheet, ribbon or veil of plastic material such as polyethylene, polyvinyl chloride (PVC), polyvinyl acetate or the like, suitable for being positioned and used in machines of the conventional type such as those for printing wallpaper or the like.

The resin solution for coating 12 is applied using industrial systems. It is prepared, for example, by dissolving the resin in denatured ethyl alcohol in a proportion of 1:3. Among others, PVAc (polyvinyl acetate) resin, for example the product marketed by the Wacker Chemic Division under the name "VINNAPAS B60", is preferable as the thermoplastic resin. The alcohol in the solution has the properties of preventing the water-repellent action of the resin, making it suitable for subsequently receiving the acrylic or vinyl layer 13 which may be of a color.

The layer 13 may not be required and, in any case, may form part of the ensuing printing process. This acrylic or vinyl layer 13, when used, is spread over the resin coating 12 after the latter has dried on the base film 11. The acrylic or vinyl layer, for this application, may be water-emulsified in a proportion of about 50% and is used as a base and background for subsequent printing thereon of the desired motifs or subjects 14. It is preferably white, unless a colored background is required at this stage, i.e., prior to printing. For the same purpose, moreover, an acrylic or vinyl resin alone may also be used, i.e., without pigment and exclusively as a binder.

It should be noted that the combination of the acrylic or vinyl layer 13 with the thermoplastic resin 12, in particular, PVAc resin, dissolved in ethyl alcohol, in addition to a "screening" action, reinforcing the whole assembly, ensures that the latter is able to withstand the rapid and demanding drying cycles (above 60° C.) required for the subsequent process of printing decorative, advertising or similar subjects or images 14.

Printing is performed continuously, with typographical colors, also in quadrichromatic print, using flexographic or other printing machines or else by means of the silk-screen process. The material thus printed is wound up on a bobbin and the latter is then transferred to a machine which performs bonding of the protective covering 15 on the printed surface. Such a covering 15 may consist of a very thin "veil" of non-woven fabric and bonding thereof onto the printed surface may be performed using a reversible bonding agent which comprises an adhesive which is reversible in aqueous solutions. For example, the reversible bonding agent may be based on methyl cellulose (such as, for example, normal Metylan or special Metylan produced by Henkel), if necessary in an aqueous solution in a ratio of 3:1. In addition, another type of reversible bonding agent may be used according to the present invention.

This very thin covering 15 of non-woven fabric, applied onto the printed surface using a water-reversible bonding agent, in addition to providing a protective screening makes it possible to "imprison", as it were, the decorative layer consisting of the combination of the underlying resin coating 12, the background layer of vinyl or acrylic color layer 13 and the print 14 performed thereon, separating it from the base film 11 for applying the material prepared using the method described onto any surface or support medium to be decorated.

The article may be marketed both with the base film 11 still attached thereto, in which case this film will be removed by the person performing the laying operation, and without the base film, in which case the printed part remains attached to the covering 15.

The application of the decorative material once removed from the base film is performed by means of bonding onto the wall, wood or other support medium. For bonding it is possible to use suitable glues of any type, such as "evalit" (trademark) and "Metylan special" in water in a proportion of 3:1, spread on the uncovered side of the material, i.e.,on the side from which the base film has been removed. The application of the material onto the support medium concerned is performed as for wallpaper onto walls, wood, etc.

Finally, once drying has occurred (after at least 6–7 hours) the covering of non-woven fabric 15 is moistened, until it may be detached, leaving free the decorative subject or motif thus transferred onto the support medium.

The nature and proportions of the products mentioned above are only illustrative and may be varied in accordance with requirements without thereby departing from the scope of the invention.

What is claimed is:

1. A transfer article for transferring to a support medium decorative subjects comprising, in order, a removable plastic base film;

a polyvinyl resin coating layer wherein the polyvinyl resin is formed by dissolving the resin in alcohol;

a printed motif layer;

a water-reversible adhesive layer comprising methyl cellulose;

a protective, water-permeable removable covering comprising a non-woven fabric;

wherein the printed motif layer is the outermost layer once the transfer article is applied to the support medium and the protective covering is removed.

2. Transfer article as in claim 4, further containing a background layer comprised of an acrylic or vinyl resin, wherein the background layer is located between the polyvinyl resin coating layer and the printed motif layer, and wherein the background layer is formed by emulsification in water.

3. Transfer article as in claim 2, wherein:

the removable plastic base film is formed of one of polyethylene, polyvinyl chloride (PVC) and polyvinyl acetate.

4. Transfer article as in claim 2, wherein the acrylic or vinyl background layer is formed by emulsifying the water in a proportion of about 50%.

5. Transfer article as in claim 1, wherein the alcohol is denatured ethyl alcohol.

6. Transfer article as in claim 5, wherein the polyvinyl resin is formed by dissolving the resin in the denatured ethyl alcohol in a proportion of 1:3.

7. A method for preparing and applying an ornamental, decorative article onto a support medium, the method comprising the steps of:

providing a removeable plastic base film;

applying a polyvinyl resin coating layer onto the base film, the polyvinyl resin being formed by dissolving the resin In alcohol;

allowing the polyvinyl resin coating layer to dry;

applying a printed motif layer to the polyvinyl resin coating layer;

applying a water-reversible adhesive layer to the printed motif layer, the adhesive layer comprising methyl cellulose;

applying on the adhesive layer a removable, protective, water-permeable covering layer comprising a non-woven fabric; and applying the transfer article to the support medium and removing the protective covering layer to expose the printed motif layer as the outermost layer of the transfer article.

8. Method as in claim 6, further comprising the step of:

applying a background layer between the polyvinyl resin coating layer and the printed motif layer, the background layer comprised of an acrylic or vinyl resin and is formed by emulsification in water.

* * * * *